United States Patent
Wang et al.

(10) Patent No.: US 11,833,615 B2
(45) Date of Patent: Dec. 5, 2023

(54) METHOD FOR PREPARING MULTIPLE-MATERIAL VARIABLE-RIGIDITY COMPONENT BY EFFICIENT COLLABORATIVE ADDITIVE MANUFACTURING

(71) Applicant: North University of China, Shanxi Province (CN)

(72) Inventors: Yu Wang, Shanxi (CN); Fumin Hou, Shanxi (CN); Hong Xu, Shanxi (CN); Hongkui Mao, Shanxi (CN); Guowei Zhang, Shanxi (CN); Zhonghua Li, Shanxi (CN); Bin Liu, Shanxi (CN); Peikang Bai, Shanxi (CN); Zhanyong Zhao, Shanxi (CN); Xin Cao, Shanxi (CN); Bingxin Guo, Shanxi (CN); Zongyi Fan, Shanxi (CN)

(73) Assignee: North University of China, Shanxi Province (CN)

(*) Notice: Subject to any disclaimer, the term of this patent is extended or adjusted under 35 U.S.C. 154(b) by 167 days.

(21) Appl. No.: 17/245,172

(22) Filed: Apr. 30, 2021

(65) Prior Publication Data
US 2021/0339340 A1 Nov. 4, 2021

(30) Foreign Application Priority Data
Apr. 30, 2020 (CN) .......................... 202010360783.X

(51) Int. Cl.
*B23K 26/348* (2014.01)
*B33Y 10/00* (2015.01)
(Continued)

(52) U.S. Cl.
CPC ............ *B23K 26/348* (2015.10); *B22F 10/28* (2021.01); *B22F 10/50* (2021.01); *B22F 10/85* (2021.01);
(Continued)

(58) Field of Classification Search
CPC .... B23K 26/348; B23K 26/342; B23K 26/60; B23K 9/044; B23K 37/0229;
(Continued)

(56) References Cited

U.S. PATENT DOCUMENTS

| 6,940,037 B1 * | 9/2005 | Kovacevic | B23K 26/144 |
| | | | 219/121.45 |
| 2006/0065546 A1 * | 3/2006 | Curodeau | B82Y 30/00 |
| | | | 205/640 |

(Continued)

FOREIGN PATENT DOCUMENTS

CN 110238404 A * 9/2019

*Primary Examiner* — John J Norton
*Assistant Examiner* — Simpson A Chen
(74) *Attorney, Agent, or Firm* — Potomac Law Group, PLLC; Vincent M. DeLuca

(57) ABSTRACT

The disclosure provides a method for preparing a multiple-material variable-rigidity component by efficient collaborative additive manufacturing, relates to the technical field of additive manufacturing. In the disclosure, the method comprises: pretreating a component structure model and dividing the component structure model into a lightweight part with complex pore structures and a solid part that needs to be manufactured rapidly; preparing the lightweight part by a selective laser melting prototyping; performing a surface treatment on the prepared lightweight part to obtain a treated lightweight part; preparing the solid part on the treated lightweight part by a wire arc additive manufacturing, to obtain a component.

4 Claims, 1 Drawing Sheet

(51) Int. Cl.
  *B33Y 50/02*    (2015.01)
  *B23K 26/342*   (2014.01)
  *B23K 26/60*    (2014.01)
  *B33Y 40/20*    (2020.01)
  *B22F 10/85*    (2021.01)
  *B22F 10/50*    (2021.01)
  *B22F 10/28*    (2021.01)
  *B23K 9/04*     (2006.01)
  *B23K 37/02*    (2006.01)

(52) U.S. Cl.
  CPC ............ *B23K 9/044* (2013.01); *B23K 26/342* (2015.10); *B23K 26/60* (2015.10); *B33Y 10/00* (2014.12); *B33Y 40/20* (2020.01); *B33Y 50/02* (2014.12); *B23K 37/0229* (2013.01)

(58) Field of Classification Search
  CPC .. B23K 26/062; B23K 26/0608; B33Y 10/00; B33Y 50/02; B33Y 30/00; B33Y 40/20; B22F 10/50; B22F 10/28; B22F 10/85
  USPC ........................................................ 219/76.1
  See application file for complete search history.

(56) References Cited

U.S. PATENT DOCUMENTS

| | | | | |
|---|---|---|---|---|
| 2014/0172111 A1* | 6/2014 | Lang | ....................... | B33Y 80/00 |
| | | | | 623/20.32 |
| 2015/0367448 A1* | 12/2015 | Buller | ................... | B29C 64/255 |
| | | | | 219/74 |
| 2017/0182557 A1* | 6/2017 | Tsubota | .................. | B22F 10/20 |
| 2017/0239753 A1* | 8/2017 | Yerazunis | ............ | B23K 26/342 |

\* cited by examiner

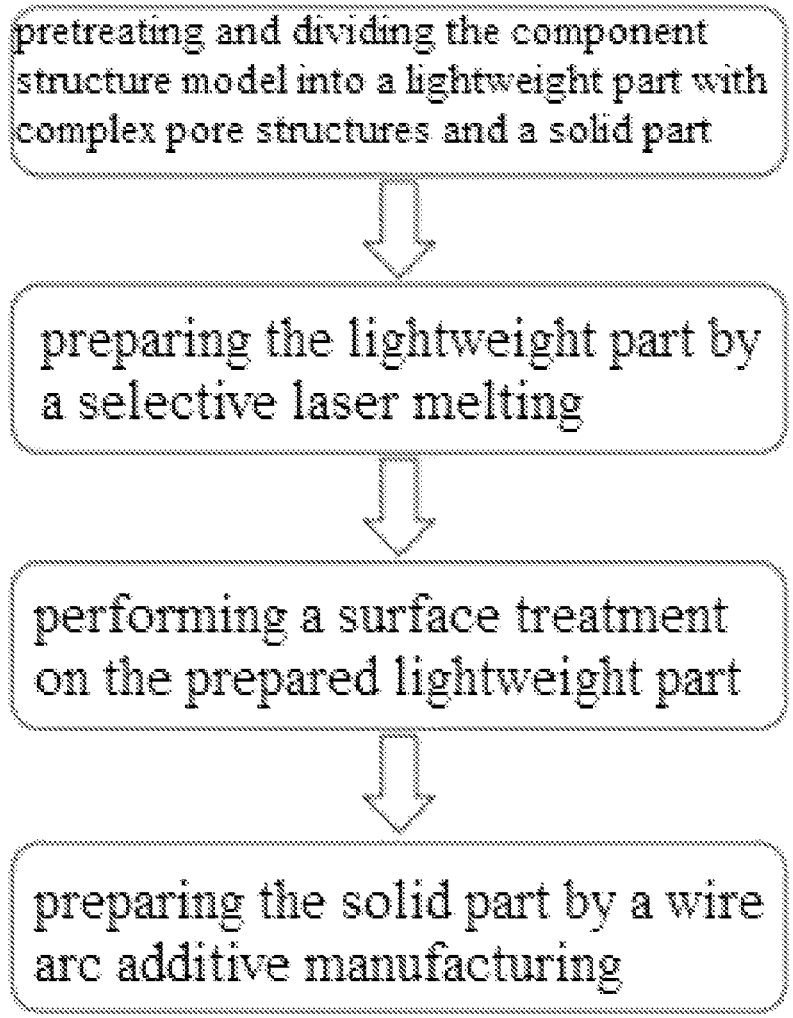

METHOD FOR PREPARING MULTIPLE-MATERIAL VARIABLE-RIGIDITY COMPONENT BY EFFICIENT COLLABORATIVE ADDITIVE MANUFACTURING

CROSS REFERENCE TO RELATED APPLICATION

This patent application claims the benefit and priority of Chinese Patent Application No. 202010360783.X filed on Apr. 30, 2020, the disclosure of which is incorporated by reference herein in its entirety as part of the present application.

TECHNICAL FIELD

The disclosure relates to the technical field of additive manufacturing, in particular to a method for preparing a multiple-material variable-rigidity component by efficient collaborative additive manufacturing.

BACKGROUND ART

Selective laser melting is a kind of additive manufacturing technology, and it utilizes laser as a heat source and scans the metal powder material bed layer by layer according to the path planned in the 3D (Three Dimensional) model. The scanned metal powder material is melted and solidified to bond metallurgically to finally obtain a metal component designed by the model. Wire arc additive manufacturing is an advance additive manufacturing technology, which utilizes the arc as a heat source and makes the molten wire deposit layer by layer according to the principle of cladding layer by layer, to gradually form a metal component from the line-surface-body according to the 3D digital model.

The selective laser melting can be used to prepare a metal component with complex structures such as porous lattices. Although the prepared metal component has fine structures and smooth surface, the selective laser melting has a low forming efficiency and a high cost, and it is difficult to prepare components with large-sized and variable-rigidity structures and made of multi-materials.

The wire arc additive manufacturing can be used to prepare components with larger-sized structures, and has the advantages of high forming efficiency and low cost. However, the wire arc additive manufacturing is difficult to form metal components with complex structures such as porous lattices.

SUMMARY

The purpose of the present disclosure is to provide a method for preparing a multiple-material variable-rigidity component by efficient collaborative additive manufacturing, which can overcome the above-mentioned shortcomings and deficiencies in the prior art. The method is an efficient collaborative additive manufacturing that combines selective laser melting and wire arc additive manufacturing. An component with large-sized and complex structures could be prepared by making a lightweight part of the component by the selective laser melting, subjecting the lightweight part to a surface treatment, and then making a solid part of the component by the wire arc additive manufacturing.

The present disclosure is realized through the following technical solutions:

The method for preparing a multiple-material variable-rigidity component by efficient collaborative additive manufacturing, comprising:
1) pretreating a component structure model and dividing the component structure model into a lightweight part with complex pore structures and a solid part that needs to be manufactured rapidly according to positioning requirements of different parts;
2) preparing the lightweight part by a selective laser melting;
3) performing a surface treatment on the prepared lightweight part to obtain a treated lightweight part;
4) preparing the solid part on the treated lightweight part by an wire arc additive manufacturing, to obtain the component that meets the requirements.

In some embodiments, step 1) specifically comprises: performing a force analysis on the component structure model according to a simulation software, simplifying and repairing the component structure model based on the analysis results on the premise of meeting the use requirements, and dividing the component structure model into a lightweight part with complex pore structures and a solid part that needs to be manufactured rapidly.

In some embodiments, step 2) specifically comprises: building a 3D model with complex pore structures by a 3D software, adding a support to generate a STL file, performing a 2D slicing on the STL file, and then importing the STL file after the 2D slicing into a selective laser melting equipment; selecting a metal powder material and setting parameters for the selective laser melting, then performing the selective laser melting on the metal powder material, to obtain the lightweight part; finally, line-cutting, cleaning and drying the obtained lightweight part for the subsequent surface treatment.

In some embodiments, step 3) specifically comprises: polishing an area to be treated with the wire arc additive manufacturing on the lightweight part prepared in step 2) to remove oxide layers on the surface of the area, and cleaning oil and dirt in the area with acetone.

In some embodiments, step 4) specifically comprises: placing the treated lightweight part on a workbench of a wire arc additive manufacturing equipment by a manipulator, building a 3D model of the solid part by a 3D software, performing a slicing on the 3D model of the solid part by an offline simulation software to obtain an offline program, and feeding back the offline program to the manipulator i.e. a wire arc additive unit to determine a path of the wire arc additive unit in the area; setting parameters for the wire arc additive manufacturing, selecting a formed wire, performing the wire arc additive manufacturing according to the planned path on the treated lightweight part by the wire arc additive unit until all is completed, to obtain the target component.

In some embodiments, the lightweight part with complex pore structures in step 2) has a porous lattice structure.

In some embodiments, the metal powder material is selected from the group consisting of a stainless steel powder, an aluminum alloy powder, a titanium alloy powder, a nickel alloy powder and a metal ceramic composite material powder.

In some embodiments, the formed wire is selected from the group consisting of a nickel-based welding wire, a copper-based welding wire, an aluminum-based welding wire and an ordinary steel-based welding wire.

In some embodiments, the component obtained after the wire arc additive manufacturing in step 4) is put into a heat treatment furnace and subjected to a stress relief treatment.

In some embodiments, the metal powder material is melted by laser selectively and layer by layer, and superimposed layer by layer according to the scanning path, wherein the scanning path is automatically generated by the selective laser melting equipment according to the information of the 2D slicing.

The present disclosure has the following beneficial effects:

1) The component with complex shapes can be prepared rapidly, reducing the processing cycle and cutting production costs.
2) The advantages of the selective laser melting and the wire arc additive manufacturing can be fully utilized, improving the level of the additive manufacturing of components with large-size and multi-materials.
3) The component with multi-materials and variable-rigidity structures can be prepared by efficient collaborative additive manufacturing, opening up new directions and fields for the development of the additive manufacturing.

BRIEF DESCRIPTION OF THE DRAWINGS

In order to clearly describe the technical solutions in the embodiments of the present disclosure, the accompanying drawings that need to be used in the description of the embodiments or the prior art will be introduced briefly below. The accompanying drawings here are used to further describe the present disclosure, which constitute a part of the disclosure. The exemplary embodiments of the present disclosure and the description thereof are used to explain the present disclosure, and do not constitute an improper limitation of the present disclosure.

FIGURE is a schematic flow diagram of the method according to embodiment (s) of the present disclosure.

DETAILED DESCRIPTION OF THE EMBODIMENTS

In order to enable those skilled in the art to better understand the present disclosure, the present disclosure will be further described clearly and completely with reference to the accompanying drawings and the embodiments below. It should be noted that the embodiments in the present disclosure and the features in the embodiments can be combined with each other if there is no conflict.

A method for preparing a multiple-material variable-rigidity component by efficient collaborative additive manufacturing, as shown in FIGURE, comprising the following steps:

1) Pretreating a component structure model and dividing the component structure model into a lightweight part with complex pore structures and a solid part that needs to be manufactured rapidly according to positioning requirements of different parts.

Step 1) specifically comprises: the component structure model is subjected to a force analysis according to a simulation software; that is, the force situation of the component structure model is analyzed through the simulation software to obtain a stress distribution diagram of different areas of the component structure model. The component structure model is simplified and repaired based on the analysis result on the premise of meeting the use requirements, which could further optimize the component structure model; according to positioning requirements of different parts of the component, the component structure model is divided into the lightweight part with complex pore structures and the solid part that needs to be manufactured rapidly.

2) Preparing the lightweight part by a selective laser melting.

Step 2) specifically comprises: a 3D software is used to build a 3D model with complex pore structures, then a support is added to generate a STL file; the STL file is subjected to a 2D slicing according to certain rules and accuracy requirements and then imported into a selective laser melting equipment; a metal powder material for the lightweight part is selected and introduced into a powder feeding device of the selective laser melting equipment to start the selective laser melting after the parameters thereof is set, obtaining the lightweight part; finally the lightweight part obtained is line-cut, cleaned and dried for the subsequent surface treatment. The complex pore structures in the lightweight part can be designed as porous lattice structures; argon is continuously injected into a prototyping cavity of the selective laser melting equipment to prevent oxidation during the process of selective laser melting; the metal powder material is melted by laser selectively and layer by layer, and superimposed layer by layer according to the scanning path, wherein the scanning path is automatically generated by the selective laser melting equipment according to the information of the 2D slicing, and the metal powder material may be any one selected from the group consisting of a stainless steel powder, an aluminum alloy powder, a titanium alloy powder, a nickel alloy powder and a metal ceramic composite material powder.

3) Performing a surface treatment on the prepared lightweight part in step 2), to regulate the interface connection performance between two parts of the component.

Step 3): the area to be treated with arc additive manufacturing on the formed lightweight part is polished to remove the oxide layers on the surface of the area, and the oil and dirt in the area is cleaned with acetone.

4) preparing the solid part on the treated lightweight part by a wire arc additive manufacturing, to obtain the component that meets the requirements.

Step 4) specifically comprises: the treated lightweight part is placed on a workbench of a wire arc additive manufacturing system by a manipulator; a 3D model of the solid part is built by a 3D software, then is subjected to a slicing by an offline simulation software to obtain an offline program; the offline program is fed back to the manipulator i.e. a wire arc additive unit to determine a path of the wire arc additive unit in the area; parameters for the wire arc additive manufacturing is set, a formed wire is selected, and the treated lightweight part is subjected to the wire arc additive manufacturing according to the planned path by the arc additive unit until all is completed, obtaining the component with target structures. The manipulator wire arc additive unit is operated by CMT (Cold Metal Transition) arc additive technology, during which inert gas argon is introduced for protection. The formed wire may be any one selected from the group consisting of a nickel-based welding wire, a copper-based welding wire, an aluminum-based welding wire, and an ordinary steel-based welding wire.

The same or different metal materials can be used for selective laser melting and wire arc additive manufacturing.

In the method of the present disclosure, the selection of the metal powder material and the formed wire should be determined according to the component or the expected structural performance requirements, such as strength and hardness. The materials selected in the selective laser melting and the arc additive manufacturing should be able to meet the expected performance requirements, and can further improve the strength or hardness or other performances of the product.

The present disclosure will be further described below in conjunction with a specific example:

Example 1

A method for preparing an component with multi-materials and variable-rigidity structures by efficient collaborative additive manufacturing was performed as follows:
1) A 3D modeling software UG was used to build a 3D structure model of a multiple-material variable-rigidity component, and the force situation thereof was analyzed through a simulation software ANSYS, obtaining a stress distribution diagram of different areas; the 3D structure model was optimized and divided into a lightweight part with a porous lattice structure and a solid part that needs to be manufactured rapidly.
2) The selective laser melting was used to prepare the lightweight part with a porous lattice structure, during which the 316 stainless steel powder with a particle size of 25 µm was selected as the raw material of the selective laser melting and was introduced into a powder feeding device. A selective laser melting equipment was set to have a preheating temperature of the formed substrate of 200° C., a laser power of 200 W, a laser scanning speed of 750 mm/s, a scanning distance of 0.12 mm, and a layer thickness of 0.05 mm. After that, the 316 stainless steel powder was sent to the formed substrate to form layer-by-layer until the 3D structure with the lightweight part with the porous lattice structure was prepared.
3) The area formed by the selective laser melting was subjected to a surface treatment, for example, the area was polished to remove oxide layers on the surface of the area, and the oil and dirt in the area was cleaned with acetone.
4) The wire arc additive manufacturing was used to prepare the solid part that needs to be manufactured rapidly, during which the 2319 aluminum-copper alloy welding wire with a diameter of 1.2 mm was used for additive manufacturing by CMT welding. The additive manufacturing was set to have a welding current of 40 A, a wire feeding speed of 4.5 m/min, a welding gun travel speed of 36 cm/min and a shielding gas flow of 15 L/min. The wire arc additive manufacturing was carried out layer by layer according to the planned path until all was completed. The component prepared was put into a heat treatment furnace with a heating temperature of 180° C. for 4 h, and then was cooled with air to stress relief, obtaining a component that meets the requirements.

The above is a clear and complete description of the technical solutions in the embodiments of the present disclosure. The described embodiments are only a part of the embodiments of the present disclosure, rather than all the embodiments. Based on the embodiments of the present disclosure, all other embodiments obtained by those of skilled in the art without creative work shall fall within the protection scope of the present disclosure.

What is claimed is:
1. A method for preparing a multiple-material variable-rigidity component by efficient collaborative additive manufacturing, comprising:
1) pretreating a component structure model and dividing the component structure model into a lightweight part with complex pore structures and a solid part that needs to be manufactured rapidly according to positioning requirements of different parts, wherein the lightweight part with complex pore structures comprises a material that is different from a material comprising the solid part;
2) preparing the lightweight part by a selective laser melting prototyping;
3) performing a surface treatment on the prepared lightweight part to obtain a treated lightweight part;
4) preparing the solid part directly on the treated lightweight part by a wire arc additive manufacturing, to obtain a component that meets the requirements,
wherein step 1) further comprises: (a) performing a force analysis on the component structure model according to a simulation for use of the component, the simulation being directed at acquiring a corresponding component structure model by using analysis results of the force analysis, and (b) dividing the component structure model into the lightweight part with complex pore structures and the solid part;
wherein step 2) comprises:
building a 3D model with complex pore structures by a 3D software, adding a support to generate an STL file, performing a 2D slicing on the STL file, and then importing the STL file after the 2D slicing into a selective laser melting equipment;
selecting a metal powder material and setting parameters for the selective laser melting, and then performing the selective laser melting on the metal powder material, to obtain the lightweight part; and
finally, cleaning and drying the lightweight part for subsequent surface treatment, wherein the metal powder material is selected from the group consisting of a stainless steel powder, an aluminum alloy powder, a titanium alloy powder, a nickel alloy powder, and a metal ceramic composite material powder;
wherein step 3) further comprises: polishing an area to be treated with the wire arc additive manufacturing on the lightweight part prepared in step 2) to remove oxide layers on a surface of the area, and cleaning oil and dirt in the area with acetone; and
wherein step 4) comprises:
placing the treated lightweight part on a workbench of a wire arc additive manufacturing equipment by a manipulator, building a 3D model of the solid part by a 3D software, performing a slicing on the 3D model of the solid part by an offline simulation software to obtain an offline program, feeding back the offline program to the manipulator to determine a path of a wire arc additive unit in the area; and
setting parameters of the wire arc additive manufacturing, selecting a formed wire, performing the wire arc additive manufacturing according to a planned path on the treated lightweight part by the wire arc additive unit, to obtain the target component;
wherein the formed wire is selected from the group consisting of a nickel-based welding wire, a copper-based welding wire, an aluminum-based welding wire, and an ordinary steel-based welding wire.
2. The method for preparing a multiple-material variable-rigidity component by efficient collaborative additive manufacturing according to claim 1, wherein the lightweight part with complex pore structures in step 2) has a porous lattice structure.

3. The method for preparing a multiple-material variable-rigidity component by efficient collaborative additive manufacturing according to claim 1, further comprising putting the component obtained after the wire arc additive manufacturing in step 4) into a heat treatment furnace with a temperature of 180° C. for 4 h and cooling with air for stress relief.

4. The method for preparing a multiple-material variable-rigidity component by efficient collaborative additive manufacturing according to claim 1, wherein the metal powder material is melted by laser selectively and layer by layer, and superimposed layer by layer according to a scanning path, wherein the scanning path is automatically generated by the selective laser melting equipment according to the information of the 2D slicing.

* * * * *